United States Patent
Heath et al.

(10) Patent No.: US 7,404,873 B2
(45) Date of Patent: Jul. 29, 2008

(54) MEMBRANE ATTACHMENT PROCESS

(75) Inventors: Michael Heath, Chelmsford, MA (US); Mark Perreault, Leominster, MA (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 296 days.

(21) Appl. No.: 11/010,893

(22) Filed: Dec. 13, 2004

(65) Prior Publication Data

US 2005/0173062 A1    Aug. 11, 2005

Related U.S. Application Data

(60) Provisional application No. 60/529,192, filed on Dec. 12, 2003.

(51) Int. Cl.
*B32B 37/00* (2006.01)
*B29C 65/00* (2006.01)

(52) U.S. Cl. .................. 156/309.6; 156/267; 156/308.2; 422/101

(58) Field of Classification Search ................. 156/267, 156/308.2, 308.4, 309.6, 323; 210/451, 455, 210/500.21, 503; 422/101
See application file for complete search history.

(56) References Cited

U.S. PATENT DOCUMENTS

| | | | | |
|---|---|---|---|---|
| 2,530,221 A * | 11/1950 | Bender | ........................ | 100/321 |
| 3,025,206 A * | 3/1962 | Scholl | ........................ | 156/219 |
| 3,522,133 A * | 7/1970 | Gross | ........................ | 156/515 |
| 4,657,867 A | 4/1987 | Guhl et al. | ........................ | 435/284 |
| 4,734,192 A | 3/1988 | Champion et al. | ........................ | 210/335 |
| 4,895,706 A | 1/1990 | Root et al. | ........................ | 422/102 |
| 4,902,481 A | 2/1990 | Clark et al. | ........................ | 422/102 |
| 4,927,604 A | 5/1990 | Mathus et al. | ........................ | 422/101 |
| 4,948,442 A | 8/1990 | Manus | ........................ | 156/73.1 |
| 5,009,780 A | 4/1991 | Sarrasin | ........................ | 210/238 |
| 5,047,215 A | 9/1991 | Manns | ........................ | 422/101 |
| 5,051,596 A | 9/1991 | Perlman | ........................ | 250/458.1 |
| 5,141,718 A | 8/1992 | Clark | ........................ | 422/99 |
| 5,227,137 A | 7/1993 | Monti et al. | ........................ | 422/101 |
| 5,470,424 A * | 11/1995 | Isaac et al. | ........................ | 156/253 |
| 5,665,247 A | 9/1997 | Valus et al. | ........................ | 210/767 |
| 5,851,346 A | 12/1998 | Hitch | ........................ | 156/542 |
| 5,853,586 A | 12/1998 | Valus et al. | ........................ | 210/406 |

(Continued)

FOREIGN PATENT DOCUMENTS

JP    60164242 A  *  8/1985

(Continued)

OTHER PUBLICATIONS

Abstract for JP 60164242.*

(Continued)

*Primary Examiner*—John L Goff
(74) *Attorney, Agent, or Firm*—Nanette S. Thomas

(57) ABSTRACT

A method is provided for attaching a membrane to a substrate by heat-bonding the membrane to the substrate. The substrate includes a top surface, a bottom surface and a receptacle therethrough. The membrane can be a porous support structure combined with a polymeric gel. The method includes the steps of inserting a mandrel into the receptacle, placing the membrane on the substrate across the receptacle, heating the membrane and substrate, and allowing the substrate to cool to provide heat-bonded interlock between the substrate and the membrane.

18 Claims, 3 Drawing Sheets

U.S. PATENT DOCUMENTS

| | | |
|---|---|---|
| 5,885,499 A | 3/1999 | Aksberg .................... 264/153 |
| 6,080,253 A | 6/2000 | Hitch ......................... 156/69 |
| 6,159,368 A | 12/2000 | Moring et al. ......... 210/321.75 |
| 6,180,705 B1 | 1/2001 | Huebner et al. ............ 524/272 |
| 6,251,660 B1 | 6/2001 | Muir et al. ............... 435/287.2 |
| 6,309,605 B1 | 10/2001 | Zermani .................... 422/101 |
| 6,315,849 B1 | 11/2001 | Ross ......................... 156/215 |
| 6,391,241 B1 | 5/2002 | Cote et al. ................. 264/153 |
| 6,432,663 B1 | 8/2002 | Seip et al. ................... 435/29 |
| 6,486,401 B1 | 11/2002 | Warhurst et al. ............. 174/66 |
| 6,514,463 B2 | 2/2003 | Zermani .................... 422/101 |
| 6,627,291 B1 | 9/2003 | Clark et al. |
| 2001/0042710 A1 | 11/2001 | Clark et al. ................ 210/459 |
| 2001/0045389 A1 | 11/2001 | Zermani et al. |
| 2002/0108898 A1 | 8/2002 | Zermani .................... 210/248 |
| 2002/0119480 A1 | 8/2002 | Weir et al. ..................... 435/6 |
| 2002/0172955 A1 | 11/2002 | Adams et al. .................. 435/6 |
| 2002/0192120 A1 | 12/2002 | DeSilets et al. ............. 422/101 |
| 2003/0015426 A1 | 1/2003 | Rooney et al. .............. 204/467 |
| 2003/0029787 A1 | 2/2003 | Liu et al. ................. 210/416.1 |
| 2003/0031829 A1 | 2/2003 | Tanner et al. ............... 428/131 |
| 2003/0049600 A1 | 3/2003 | Martin ......................... 435/5 |

FOREIGN PATENT DOCUMENTS

| | | |
|---|---|---|
| WO | WO 98/13273 A | 4/1998 |
| WO | WO 03/089136 A | 10/2003 |

OTHER PUBLICATIONS

WO 01/19504 Mar. 2001 Clark et al.*

\* cited by examiner

MEMBRANE ATTACHMENT PROCESS

CROSS-REFERENCE TO RELATED APPLICATION

This Application claims priority to U.S. Provisional Application No. 60/529,192, filed Dec. 12, 2003, the entire contents of which are incorporated by reference herein.

FIELD OF THE INVENTION

The present invention relates generally to the field of attaching membranes to substrates. In particular, the present invention relates to methods of attachment to equipment useful with biological and biochemical assays, such as multi-well sampling devices useful in such assays.

BACKGROUND OF THE INVENTION

In pharmaceutical and biological research laboratories, plates with a multitude of wells have replaced traditional test tubes for assay and analysis. For many years, multi-well laboratory plates have been manufactured in configurations ranging from 1 well to 384 wells, and beyond. The wells of multi-well plates are typically used as reaction vessels in which various assays are performed. The types of analytical and diagnostic assays are numerous. The typical areas of use include cell culture, drug discovery research, immunology, and molecular biology, among others. Current industry standard multi-well plates are laid out with 96 wells in an 8×12 matrix (mutually perpendicular 8- and 12-well rows). In addition, the height, length and width of the 96-well plates are standardized. This standardization has resulted in the development of a large array of auxiliary equipment specifically developed for 96-well formats.

Many assays or tests require a mixture of particulate or cellular matter in a fluid medium. The mixture is then subjected to combination with reagents, separation steps and washing steps. The end product of such analysis is often a residue of solid matter which may be extracted for further analysis.

Separation of solids from fluid medium is often accomplished by filtration. The separation is accomplished in or on the filter material by passing the liquid through it. The liquid can be propelled through the membrane either by a pressure differential or by centrifugal force.

One form of filtration is use of filter plates that conform to a 96 well standardized format. One significant problem with filter plates is that cross contamination may occur between wells. When a unitary filter sheet is sandwiched between two pieces of plastic molded in a 96 well format, liquid from one well, upon wetting the filter material, may wick through the sheet to neighboring wells thereby contaminating the sample contained within that well.

Another form of filtration is use of a filter sheet placed between two plastic plates. One of the plates has a series of ridges that cuts the filter sheet when the plates are ultrasonically welded together. By cutting the filter sheet around each well, the possibility of wicking between neighboring wells is eliminated if the filter material is completely severed in the welding process. However, the membrane materials and plate materials available are limited to those that can be cut by the process and ultrasonically welded.

A further form of filtration is use of a filter plate of one piece construction having wells with drain holes in the bottom and capable of receiving filter discs into the wells. The individual filter discs are used as opposed to a unitary sheet of filter paper to prevent wicking. The filter discs used in this plate are put into each well individually and are not secured to the bottom of the well. The unsecured filter discs provide for possible contamination of filtrate because some liquid from the well could pass under the filter and thereby escape filtration.

The present invention solves several problems of prior art filter plate designs by providing a method of attaching a membrane to a multi-well plate in which filtering material is securely fastened to the plate without the use of glue or other potentially contaminant chemical adhesives, and prevents cross contamination.

SUMMARY OF THE INVENTION

A method is provided for attaching a membrane to a substrate by heat-bonding the membrane to the substrate. The substrate includes a top surface, a bottom surface and a receptacle therethrough. The membrane can be a porous support structure combined with a polymeric gel. The method includes the steps of inserting a mandrel into the receptacle, placing the membrane on the substrate across the receptacle, heating the membrane and substrate, and allowing the substrate to cool to provide heat-bonded interlock between the substrate and the membrane.

In a further aspect of the invention, a method is provided for attaching a membrane to a substrate including the steps of providing a polypropylene multiwell plate having a top surface, bottom surface, and a plurality of apertures therethrough; inserting a mandrel into each of the apertures; placing a gel media, which includes a polyacrylamide gel attached to a polyester structure, across the top surface of the plate; heating the membrane and the plate; and allowing the plate to cool forming a heat-bonded interlock between the gel media and the plate with least one aperture being substantially covered at one end by the gel media.

DETAILED DESCRIPTION OF THE INVENTION

The present invention overcomes the shortcomings of the prior art by providing a method for attaching a media or membrane to a substrate which provides a sealably secure attachment thereof, prevents cross-contamination between wells, and eliminates the introduction of other contaminates such as glues, adhesives which are used to attach media or membrane. The method of the present invention includes interlocking the media or membrane to the substrate by heat-bonding.

Figure 1:
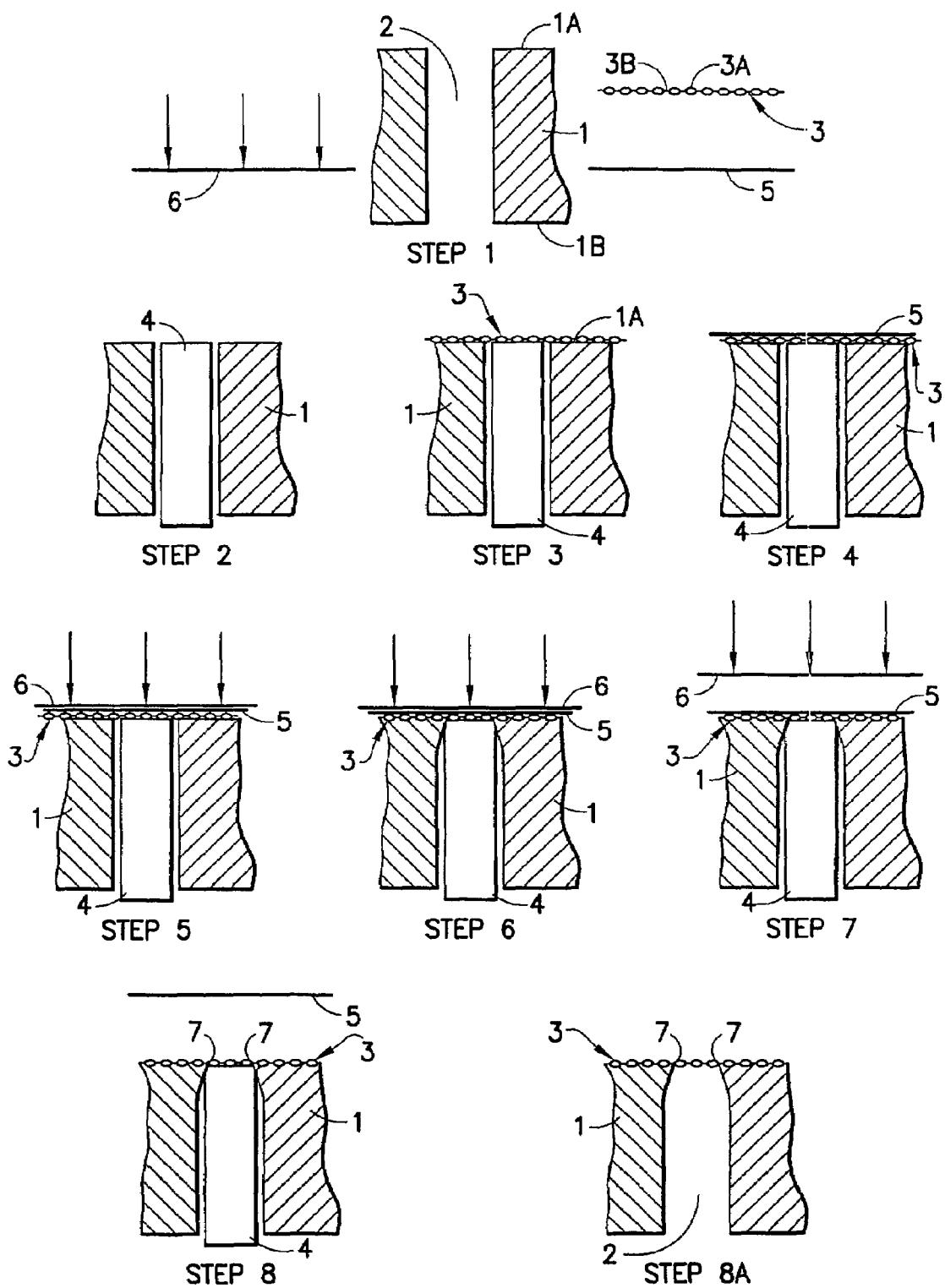
FIG. 1 is a schematic representation of method steps used in the present invention.
Figure 3:
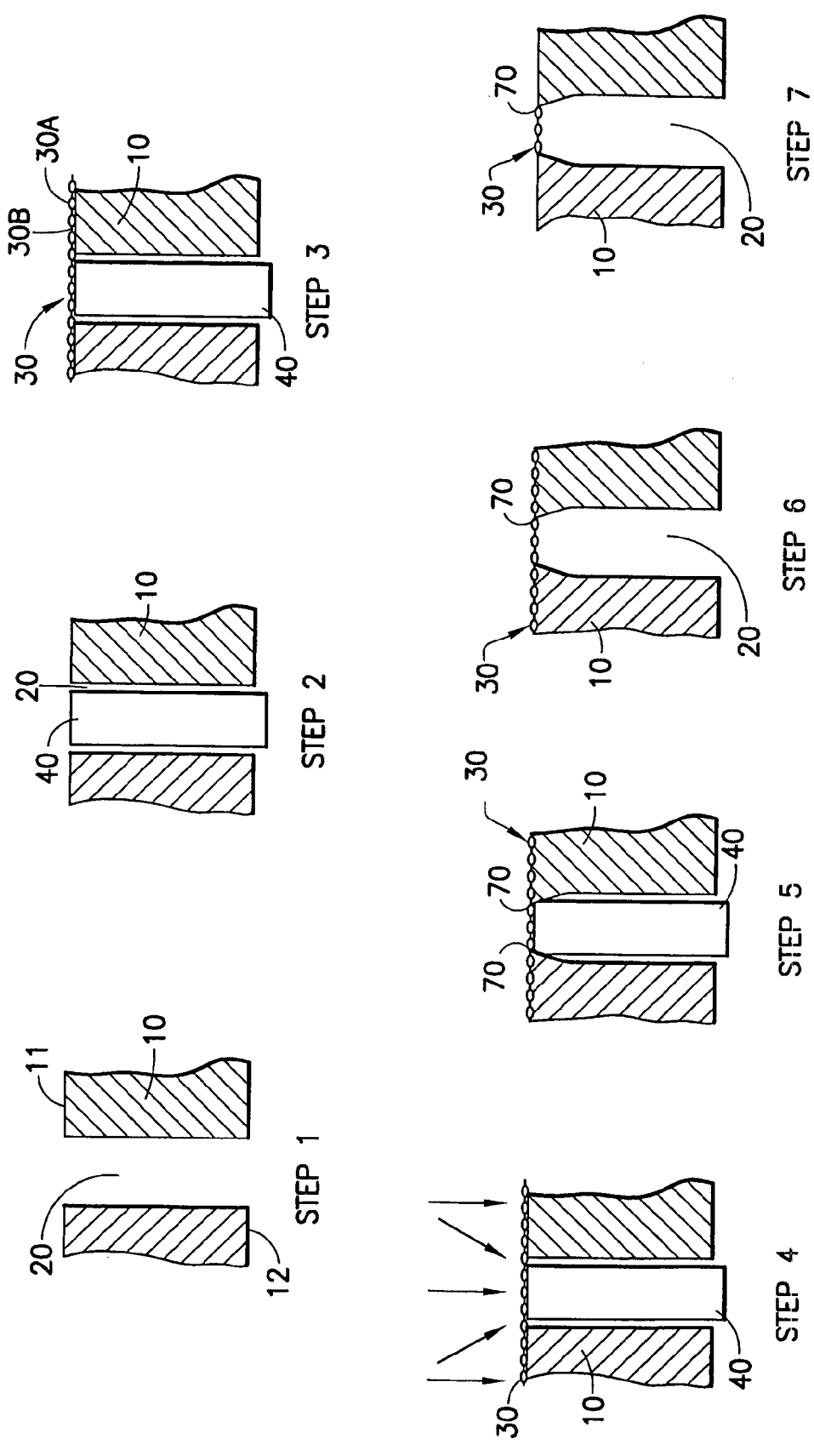
FIG. 3 is a schematic representation of another embodiment of method steps used in the present invention.

As shown in FIG. 1, Steps 1-8A, and FIG. 3, Steps 1-6, the methods of attachment of the present invention include the use of heat-bonding to attach a membrane to a substrate. Generally, the methods of the present invention include three stages: a preparation stage, a heating stage and a cooling stage.

With the first embodiment of the invention, the preparation stage includes providing a substrate 1, a membrane 3, a mandrel 4, a conductive medium 5 and a heat-source 6, as shown in Step 1 of FIG. 1. The substrate 1 may be a plate, a tray or other similar structure preferably unitarily formed of a thermoplastic material, and including a sidewall and inner walls to define at least one receptacle 2, which may be a well or aperture. The substrate 1 is preferably a plate, more preferably a multiwell plate. The preferred design of the substrate 1 is a quadrilateral shape, having a rectangular body or slab with two opposed, and substantially planar, surfaces defining a top surface 1A and a bottom surface 1B. However, for the purposes of the present invention, the substrate 1 may be fabricated in any practicable configuration.

Generally, with the substrate 1 being a multiwell plate, a plurality of identical receptacles 2, in the form of wells, are formed therethrough each extending from a respective opening in the top surface 1A of the substrate 1 to another opening in the bottom surface 1B of substrate 1. The depth of each of the receptacles 2 is determined by the thickness of the substrate 1, and together with the diameter of the receptacle 2, determines the volume of liquid that the receptacle 2 can hold. The receptacles 2 may be cylindrical, conical or have other configurations depending upon the wishes of the designer or user. The cross-section of the receptacles 2 may be uniform or vary in size and shape, i.e. square, rectangular, and oval, etc. For example, the substrate 1 may include openings of the receptacles 2 in the bottom surface 1B which are circumscribed with a groove or channel, and the top surface 1A may have openings of the receptacles 2 of various geometrical shapes, such as squares, circles, polygons and so forth. Preferably, the openings of the receptacles 2 in the top surface 1A are formed to enhance attachment of the membrane 3 thereabout (e.g., being bounded by textured or raised surfaces).

Multiwell plates having six, twelve, twenty-four, forty-eight and ninety-six wells per plate are commonly known and available. Most standard multiwell plates have the wells arranged in orthogonal rows and columns so as to be able to clearly identify the individual wells being used. Of course, the arrangement of the wells in the plate is not an essential limitation of the present invention, since any arrangement of wells is contemplated by the invention.

The substrate 1 is preferably formed of a somewhat rigid, water-insoluble, fluid-impervious, thermoplastic material chemically non-reactive with the fluids to be employed in the assays to be carried out with the apparatus. The term "somewhat rigid" as used herein is intended to mean that the material will resist deformation or warping that would prevent maintenance of a substantially planar surface, under light mechanical or thermal load, although the material may be somewhat elastic as well. Suitable materials include those materials having the above-discussed properties as well as being in a molten state at determined temperatures, and returning to the original state at a period of time after removal of the heat source. Suitable materials include polyvinyl chloride with or without copolymers, polyethylene, polypropylene, polystyrene, copolymers of polystyrene (e.g., ABS), chlorinated olefins (i.e., COC polymers, COC copolymers), derivatives and the like.

The substrate 1 is heat-bonded to a membrane 3 that is disposed across at least one of the receptacles 2. The membrane 3 may provide for filtration, separation, and/or retention of fluid disposed in the receptacle 2, and/or act as a reaction media for the fluid disposed in the receptacle 2. The membrane 3 may be a single sheet covering the top surface 1A of the substrate 1 extending across one or more of the receptacle(s) 2, or a plurality of separate membranes 3 may be provided which extend across one or more of the receptacle(s) 2.

Generally, the membrane 3, or media, includes a support structure 3A supporting a polymer composition 3B. The support structure 3A can be a mesh, membrane, or porous support structure having a predetermined porosity/open area to provide the desired support for the polymer composition 3B while allowing for adequate amount of surface area of the polymer composition 3B within the pores/open area for contact/interaction with the fluid medium being tested. The materials of construction and porosity of the support structure 3A depend on the desired use. The support structure 3A is preferably substantially hydrophobic though it may be hydrophilic depending on the use and the relevant composite intended for use therewith. Therefore, the support structure 3A may be formed from polymeric materials, metals, natural materials, textiles, and combinations thereof. Preferably, the support structure 3A is formed from polymeric materials such as polyester, polyethylene, polypropylene, and combinations thereof. Suitable commercially available support structures include, but are not limited to, mesh materials made by Sefar, of Switzerland, such as Sefar 07-105/52.

Additionally, the support structure 3A may be formed by using various techniques such as textile or non-textile constructions, for example, weaving (screen, open weave, closed weave) braiding, knitting, porous cast and the like. Preferably, the support structure 3A is a woven mesh-like construction having a network structure with voids or open areas therebetween. The porosity/percentage of open area within the network structure of the support structure 3A is adjusted to provide rigidity and strength for the membrane, as well as providing open areas or voids for the polymeric material to be captured and formed therein. The majority of uses would require a percentage of open area of about 20 percent to about 80 percent open area, preferably about 52 percent of open area. Additionally, the support structure 3A ranges in thickness from about 0.002 inches to about 0.010 inches, preferably between about 0.0025 inches to about 0.0035 inches.

The support structure 3A supports a polymeric composition 3B within the open areas. The composition 3B is preferably a gel including primarily polyacrylamide, copolymers of polyacrylamide, and combinations thereof. Suitable commercial available polymeric compositions include, but are not limited to Effipure™ (which may also be known as Hybrigel), from EXACT Sciences, Corp., of Marlborough, Mass. However, other materials may be used in combination with polyacrylamide, or separately therefrom, such as chemically modified acrylamides, starch, dextrons, cellulose-based polymers, and derivatives and/or combinations thereof.

The membrane 3 can be formed using a variety of techniques depending on the type of support structure and polymeric composition being used. One way to form the membrane 3 is by polymerizing and drying the polymeric composition 3B on the support structure 3A. Initially, the polymeric composition 3B is formed by copolymerizing an aqueous solution of acrylamide and an aqueous solution of acrydite-modified oligonucleotides with crosslinker. The solution is introduced to the support structure 3A which acts as a capture layer to wick the solution into the open areas/voids of the support structure 3A. The solution dries, forming a crosslinked gel in defining the polymeric composition 3B on and within the open areas of the support structure 3A. The resulting crosslinked functionalized polyarcylamide gel is characterized as 5% solids and 5% crosslinked material. As will be recongnized by those skilled in the art, the membrane 3 may be a filtering material and/or provide a reactive media.

Step 1 of FIG. 1 further shows the conductive medium 5 and the heat-source 6 being provided which are explained in further detail below. The conductive medium 5 is thermally conductive.

With reference to the first embodiment shown in FIG. 1, the preparation stage further includes Step 2 of FIG. 1, in which the mandrel 4 is inserted into the receptacle 2 and that is positioned to be aligned with the conductive medium 5. The mandrel 4 is configured to the internal dimensions of the individual receptacle 2 to prevent excessive deformation of the substrate 1 within the receptacle 2 during the sealing operation. The mandrel 4 may be made from a variety of materials as known in the art that have a melting temperature above the melting temperature of the substrate 1. The mandrel 4 may be constructed of a thermally conductive material such as a metal, i.e. brass, or of a thermally non-conductive material, such as a polymer.

As shown in Step 3, the membrane 3 is placed directly onto the top surface 1A of the substrate 1 over the receptacle 2. Step 4 shows the conductive medium 5 being placed on top of the membrane 3. The conductive medium 5 is typically any material which can conduct heat from the heat-source 6 to the membrane 3 without thermally, chemically or physically interacting, deforming or reacting with the membrane 3. The medium 5 is typically metallic and may range in thickness. A suitable medium 5 is a stainless steel foil having a thickness of between about 0.0005 and 0.01 inches. The medium 5 is interleaved between the membrane 3 and the heat-source 6 to aid in heat transfer and ensure that the heat-source 6 does not directly contact the membrane 3.

The heating stage is shown in Steps 5 and 6 of FIG. 1. The heat-source 6 is heated to a desired temperature range to provide a melting of the substrate 1 and/or the membrane 3, thereby causing bonding therebetween. The desired temperature varies depending on the materials of the substrate 1 and the membrane 3 and melting properties thereof. The heat source 6 may be of any known type in the art. For example, the heat-source 6 can be a sealing die which is constructed of various materials such as brass, beryllium copper, and/or chrome plated beryllium copper. The die may be attached to a platen with the platen being configured to contact the conductive medium 5. The heat-source 6 may of various configurations, as is known in the art, to provide a heat-bonded interlock 7 between the membrane 3 and the substrate 1. Preferably, the heat-source 6 is dimensioned to form a melt ring about each individual receptacle 2. For example, the heat-source 6 may include a disc-shaped platen dimensioned slightly greater than the diameter of the receptacle 2. The overlap of the heat-source 6 and the substrate 1 will define the area of thermal bonding. With this arrangement, the heat-source 6 provides heat to a localized area about each receptacle 2. The localized areas about the receptacles 2 become molten and provide individual heat-bond interlocks 7 between the membrane 3 and the perimeter of each receptacle 2 independent from the next receptacle 2.

As an alternative configuration, the heat-source 6 may be formed to simultaneously engage two or more of the receptacles 2. With this arrangement, portions of the membrane 3 between the receptacles 2 may also be bonded to the substrate 1.

The heat-source 6 is preferably configured to provide sufficient heat to melt the substrate 1. It is further preferred that the membrane 3 not be melted. As such, the molten material of the substrate 1 wicks into the membrane 3 (particularly into the support structure 3A) to achieve mechanical interactions therewith. With the support structure 3A being formed of material compatible with the substrate 1, chemical bonding may be additionally achieved therebetween. It is preferred that the heat-source 6 provide heat at temperatures between about 350° F. to about 410° F., more preferably 390° F. to 400° F.

As shown in Step 5, of FIG. 1, the heat-source 6 contacts the conductive medium 5 for a time interval which also depends on the materials used in this bonding process. It is also preferred that the heat-source 6 apply pressure to the conductive medium 5 when in engagement therewith. Any configuration known to those skilled in the art may be utilized. By way of non-limiting example, an air cylinder may be connected to the heat-source 6 (e.g., the die) to provide pressure thereto. Generally, the medium 5 is contacted with the heat-source 6 less than about 6 seconds at pressures from about 10 psi to about 45 psi. The pressure is adjusted depending on the cylinder size, and desired bonding area of the membrane 3, including the molten material that is displaced.

The conductive medium 5 may be formed of various configurations. For example, the conductive medium 5 may be coextensive with the substrate 1. Alternatively, the conductive medium 5 may be provided as a plurality of components with each component corresponding to each desired heat-bonded area. Thus, with disc-shaped heat-sources 6 being used, disc-shaped components of the conductive medium 5 may also be used.

With sufficient heating, portions of the substrate material 1, particularly at the top surface 1A, become molten and flow into the support structure 3A of the membrane 3, thereby displacing some of the polymeric composition 3B, as shown in Step 6 of FIG. 1. This material exchange between the substrate 1 and the polymeric composition 3B across the support structure 3A creates a molten interface. In addition, the opening of the receptacle 2 may be deformed at the top surface 1A. The mandrel 4 prevents excessive deformation and generally maintains the shape of the receptacle 2.

Steps 7, 8 and 8A show the cooling stage. The cooling stage includes retracting the heat-source 6 from the conductive medium 5, as shown in Step 7. Step 8 shows removal of the conductive medium 5. The mandrel 4 is then removed, as shown in Step 8A. The molten interface cools forming a solid heat-bonded interlock 7 between the membrane 3 and the substrate 1. The heat-bonded interlock 7 is a mechanical interlock, or seal, which may prevent fluid that may be contained in the receptacle 2 from cross contaminating, or otherwise passing, to an adjacent receptacle 2. Accordingly, "cross talk" between receptacles 2 may be avoided.

Figure 2:
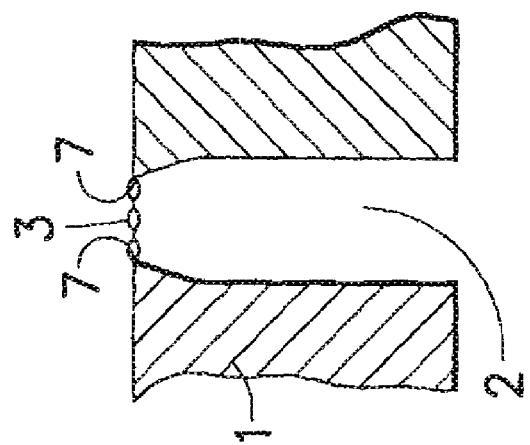
FIG. 2 is a schematic representation of additional method steps which can be used in the present invention.
Figure 2:
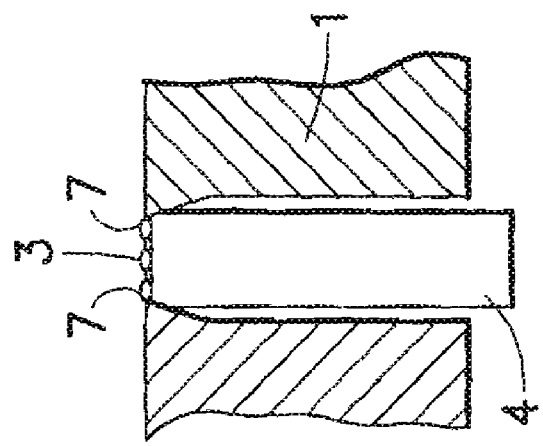

Additionally, FIG. 2 shows optional Steps 9 and 9a which may be used for removing any excess membrane 3 exterior to the heat-bonded interlock 7 about the receptacle 2. After Step 8 of FIG. 1, which is prior to removing the mandrel 4, a cutting device, such as a laser, is used to cut and remove the excess membrane material 3 not interlocked across the receptacle 2 as shown in FIG. 9. Removal of the excess membrane 3 between the receptacles 2 prevents cross-contamination between receptacles 2. Various cutting devices may be used depending on the materials of construction of the membrane and substrate as well as contaminant concerns. FIG. 9A shows the removal of the mandrel 4 and the end product being the membrane 3 attached to a substrate 1 across the receptacle 2 at the mechanical interlock 7. Removal of the excess membrane 3 provides physical separation between the heat-bonded portions of the membrane 3 and further minimizes the likelihood of "cross talk" between the receptacle 2.

With the second embodiment of the invention, the method as shown in FIG. 3, Steps 1-3 are similar to Steps 1-3 of the first embodiment (FIG. 1). Step 1 of FIG. 3 shows a substrate 10, similar to the above-described substrate 1, having a top surface 11, a bottom surface 12 and at least one receptacle 20 formed therein. Step 2 shows the mandrel 40 inserted into the receptacle 20. Step 3 shows a membrane 30 having a polymeric composition 30B combined with a support structure 30A placed across the top surface 11 of the substrate 10 over the receptacle 20. Step 4 shows the membrane 30 and the substrate 10 being heated. With the second embodiment, a conductive medium is not required. Heat may be applied non-conductively from a remote source, such as by convection or radiation. Pressure can likewise be applied from a remote source (e.g., elevated ambient pressure). After heating, Step 5 shows the substrate 10 being allowed to cool to provide a heat-bonded interlock 70 between the substrate 10 and the membrane 30 over the receptacle 20. Step 6 shows the removal of the mandrel 40. Additionally, Step 7 may be incorporated which shows the excess membrane 30 that is not heat-bonded being removed from around the receptacle 20 without disturbing the heat-bonded interlock 70. Step 7 is shown with a dotted arrow as it is not a required step depending on the end use.

EXAMPLE

Preparation of the Membrane

A support matrix (Sefar polyester mesh, Sefar 07-105/52) is disposed between two glass plates. In particular, a pre-cleaned sheet of Sefar polyester mesh is placed in the center of one pre-cleaned glass plate. A second pre-cleaned glass plate is placed on top of the mesh, such that the top edge of the mesh protrudes from the top glass plate.

Polymeric mixture (Effipure MUMU) is then prepared by copolymerizing an aqueous solution of acrylamide and an aqueous solution of acrydite-modified oligonucleotides with crosslinker.

The polymeric mixture is introduced to the mesh by using a pipette to pipette the polymerized mixture onto the top edge of the mesh. The liquid slowly wicks into the mesh until the entire mesh is covered. The glass sheets are maintained in securement together and the material is allowed to polymerize for 4 hours at room temperature. After the polymerization, the glass plates are removed from the membrane, and the membrane is dried.

Preparation of the Substrate

A polypropylene multiwell plate having capture wells is placed onto a series of mandrels, each configured to the internal dimensions of the capture wells. The membrane is placed directly on top of the plate across the capture wells. A piece of 0.005 inch thick stainless steel foil is placed on top of the membrane.

Sealing the Membrane to the Substrate

A brass sealing die, connected to a 2 inch air cylinder, is heated to a temperature of 390 F (+10 F). With a stainless steel foil being on top of the multiwell plate, the die heats the membrane via the foil, for a time interval of 0.5 seconds (+0.5 seconds) at a pressure of 16 psi (+4 psi).

Portions of the multiwell plate become molten and flow into the membrane structure displacing some of the polyacrylamide gel. Thereafter, the die is retracted, the foil is removed, and the molten interface cooled with the membrane becoming mechanically interlocked across the capture wells. Excess, un-bonded membrane from around the wells may be trimmed and discarded.

Having described particular arrangements of the present invention herein, it should be appreciated by those skilled in the art that modifications may be made thereto without departing from the contemplated scope thereof. Accordingly, the arrangements described herein are intended to be illustrative rather than limiting, the true scope of the invention being set forth in the claims appended hereto.

What is claimed is:

1. A method for attaching a membrane to a substrate comprising the steps of:
   (a) providing a substrate having spaced apart top surface and bottom surface, and a receptacle therethrough;
   (b) inserting a mandrel into said receptacle without said mandrel excessively deforming the shape of said receptacle;
   (c) placing a membrane comprising a polymeric composition combined with a support structure across said top surface of said substrate over said receptacle, wherein said support structure is a woven mesh-like construction having a network structure with voids or open areas therebetween for capturing said polymeric composition;
   (d) heating said membrane and said substrate, said heating being applied to a side of said membrane opposite said substrate; and
   (e) allowing said substrate to cool to provide a heat-bonded interlock between said substrate and said membrane, wherein said heating is applied conductively through a conductive medium placed on said membrane, and wherein said step of heating includes:
   contacting said medium with a heat-source for a length of time required to melt said substrate into a molten state forming a molten substrate, said molten substrate flowing into said support structure of said membrane and displacing a portion of said polymeric composition from said support structure, wherein, with cooling of said molten substrate located in said support structure, mechanical interactions being defined between said cooled molten substrate and said support structure.

2. The method of claim 1, wherein said heat-source contacts said medium for a time interval of less than about 6 seconds at a pressure range of about 10 psi to about 45 psi.

3. The method of claim 1, wherein said heat-source is a die.

4. The method of claim 1, further comprising the steps of cutting and removing excess membrane not heat-bonded and interlocked to said substrate.

5. The method of claim 1, wherein said heating is at a temperature of about 350° F. to about 410° F.

6. The method of claim 1, wherein said support structure is a polymeric material.

7. The method of claim 6, wherein said support structure is polyester.

8. The method of claim 1, wherein said polymeric composition is selected from a group consisting of polyacrylamide, chemically modified acrylamides, starch, dextrons, cellulose-based polymers, and combinations thereof.

9. The method of claim 1, wherein the step of providing said membrane comprises polymerizing said polymeric composition to said support structure.

10. The method of claim 1, wherein said substrate is selected from the group consisting of polyester, polyethylene, polypropylene, and combinations thereof.

11. The method of claim 1, wherein said substrate is a multiwell plate.

12. A method for attaching a membrane to a substrate comprising the steps of:
   (a) providing a polypropylene multiwell plate having a top surface, bottom surface, and a plurality of apertures therethrough;
   (b) inserting a mandrel into each of said apertures without said mandrels excessively deforming the shapes of said apertures;
   (c) placing a gel media across said top surface of said plate, wherein said gel media comprises a polyacrylamide gel attached to a polyester structure, wherein said polyester structure is a woven mesh-like construction having a network structure with voids or open areas therebetween for capturing said gel media;

(d) heating said media and said plate, said heating being applied to a side of said media opposite said plate; and (e) allowing said plate to cool forming a heat-bonded interlock between said gel media and said plate, wherein at least one aperture is substantially covered at one end by said gel media, wherein said heating is applied conductively through a conductive medium placed on said gel membrane, and wherein said step of heating includes:

contacting said conductive medium with a heated die for a length of time required to melt said multiwell plate forming a molten substrate, said molten substrate flowing into said polyester structure and displacing said gel from said polyester structure, wherein, with cooling of said molten substrate located in said polyester structure, mechanical interactions being defined between said cooled molten substrate and said polyester structure.

13. The method of claim 12, further comprising the steps of cutting and removing excess gel media.

14. The method of claim 12, wherein said step of contacting said heated die with said conductive medium is for about 6 seconds or less.

15. The method of claim 12, wherein said step of contacting said heated die with said conductive medium at pressures from about 10.0 psi to about 45.0 psi.

16. The method of claim 12, wherein said die is heated to a temperature of between about 390 F. to about 400 F.

17. The method of claim 1, wherein said conductive medium is a foil.

18. The method of claim 12, wherein said conductive medium is a foil.

* * * * *